United States Patent
Choi et al.

(10) Patent No.: US 8,237,695 B2
(45) Date of Patent: Aug. 7, 2012

(54) CODEC CONTROL

(75) Inventors: Mike S. Choi, Rocklin, CA (US); Robert M. Fosha, Folsom, CA (US); Scott R. Janus, Davis, CA (US); Aaron F. Leatherman, Folsom, CA (US); Scott M. Rowe, Folsom, CA (US); Wade M. Thompson, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/226,297

(22) Filed: Sep. 6, 2011

(65) Prior Publication Data

US 2011/0316866 A1    Dec. 29, 2011

Related U.S. Application Data

(63) Continuation of application No. 12/886,507, filed on Sep. 20, 2010, now Pat. No. 8,035,631, which is a continuation of application No. 10/772,041, filed on Feb. 3, 2004, now Pat. No. 7,825,915.

(51) Int. Cl.
*G06F 3/038* (2006.01)

(52) U.S. Cl. ........ 345/204; 345/629; 709/231; 711/165; 717/138

(58) Field of Classification Search ............ 345/1.1–1.3, 345/87, 204, 629; 709/205, 230, 231; 711/38, 711/100, 154, 165; 714/38; 717/138
See application file for complete search history.

(56) References Cited

U.S. PATENT DOCUMENTS

| | | | |
|---|---|---|---|
| 5,604,843 | A | 2/1997 | Shaw et al. |
| 2002/0057265 | A1 | 5/2002 | Tamura et al. |
| 2002/0097234 | A1 | 7/2002 | Sauber |
| 2002/0154102 | A1 | 10/2002 | Huston |
| 2003/0117382 | A1 | 6/2003 | Pawloski et al. |
| 2003/0193486 | A1 | 10/2003 | Estrop |
| 2004/0133696 | A1 | 7/2004 | Comstock |
| 2004/0212610 | A1 | 10/2004 | Hamlin |
| 2005/0030255 | A1 | 2/2005 | Chiu et al. |
| 2005/0099431 | A1 | 5/2005 | Herbert et al. |
| 2005/0104899 | A1 | 5/2005 | Swartz et al. |
| 2005/0128192 | A1 | 6/2005 | Heintzman et al. |
| 2005/0155043 | A1 | 7/2005 | Schulz et al. |

FOREIGN PATENT DOCUMENTS

| | | |
|---|---|---|
| JP | 6-250623 | 9/1994 |
| JP | 2003-518663 A | 6/2003 |
| JP | 2003-196223 | 7/2003 |
| JP | 2003248451 | 9/2003 |
| KR | 10-2002-0068054 | 8/2002 |

(Continued)

OTHER PUBLICATIONS

Dirks, Bill: "Video for Linux Two—Video Compression/Decompression Specification", Internet Article, Online! Sep. 13, 1999, XP002343889.

(Continued)

*Primary Examiner* — Kimnhung Nguyen
(74) *Attorney, Agent, or Firm* — Blakely, Sokoloff, Taylor & Zafman LLP

(57) ABSTRACT

A method and system for a software driver of a graphics controller to work with a display codec. The software driver may be configured to work with different display codecs at different periods of time while using a default configuration. Other embodiments are also described.

20 Claims, 3 Drawing Sheets

FOREIGN PATENT DOCUMENTS

| | | |
|---|---|---|
| WO | WO 01/42934 | 6/2001 |
| WO | WO-02093368 | 11/2002 |

OTHER PUBLICATIONS

PCT International Search Report and Written Opinion for PCT Application No. PCT/US2005/001277 mailed Oct. 24, 2005, 12 pages.

PCT Preliminary Report on Patentability and Written Opinion for PCT/UST2005/001277 dated Dec. 21, 2007, (7 pages).

UK Intellectual Property Search Report for GB Application No. GB0615565.9 dated Jun. 18, 2007, 2 pages.

VESA, "VESA Enchanced Extended Display Identification Data—Implementation Guide", Version 1.0, http://www.vesa.org/Public/EEDIDguideV1.pdf, (Jun. 4, 2001), 1-18.

CODEC CONTROL

RELATED APPLICATIONS

The present application is a continuation of U.S. patent application Ser. No. 12/886,507, filed Sep. 20, 2010, now U.S. Pat. No. 8,035,631 which is a continuation application of U.S. patent application Ser. No. 10/772,041, filed Feb. 3, 2004, now issued as U.S. Pat. No. 7,825,915, which is incorporated herein by reference.

FIELD

Specific matter disclosed herein relates to codec control.

BACKGROUND

Heretofore, there has been no standard command interface for display codecs; each codec has used a proprietary register set for control purposes. Codecs from different companies are likely to have incompatible commands. Even different codecs from the same company are like to have incompatible commands. Conventionally, adding support for a new display codec to graphics controller software has involved one of two options:
1) Adding the new codec by "hard-coding" it into graphics controller software; or
2) Adding to the graphics controller software a new software module compliant with a pre-specified hardware abstraction layer (HAL) for the new codec.

Unfortunately, both of these options involve developing a new version of the graphics controller software.

BRIEF DESCRIPTION OF DRAWINGS

Non-limiting and non-exhaustive embodiments will be described with reference to the following figures, wherein like numeral refer to like part, and wherein.

DETAILED DESCRIPTION

Figure 1:
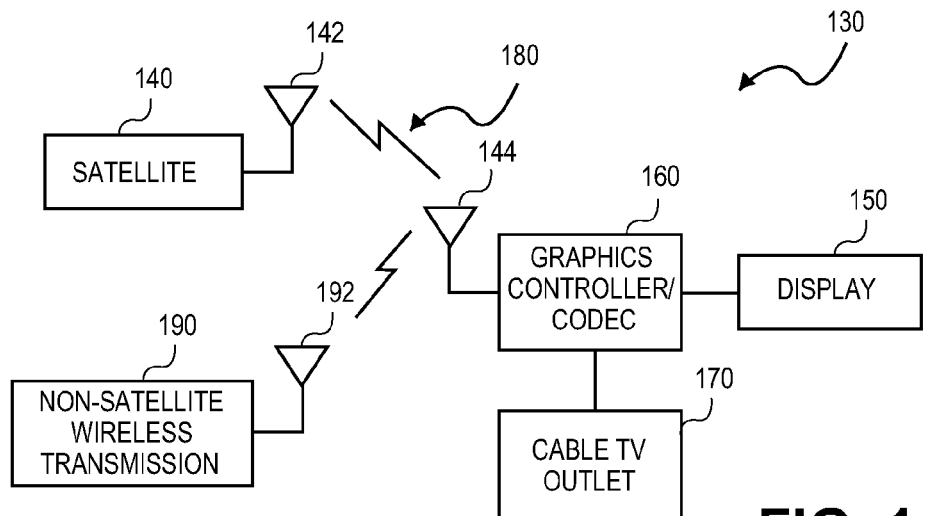
FIG. 1 is a diagram illustrating a system embodiment.

In the following description, specific details of exemplary embodiments of the present invention are set forth. However, it is understood that embodiments of the invention may be practiced without these specific details. In other instances, circuits, structures and techniques have not been shown in detail in order not to obscure the understanding of this description.

Communication with digital display devices has become of increased interest due to, among other reasons, recent FCC (Federal Communications Commission) regulations/standards on digital communications that have been set regarding digital signals and digital displays such as television sets. Specifically, television sets and computer systems are currently being created to utilize the recent FCC changes in digital display communication technologies.

The ever-increasing performance of personal computers (PC's), e.g., desktop computers, laptop computers, palmtop computers, etc., has allowed them to serve as hosts to a wide range of applications such as video. To understand how different applications work, an overview of the components of a PC is believed appropriate.

PCs often include audio controller drives for speakers and may receive input from a microphone as well. Many of today's audio controllers are fairly sophisticated and may be capable of sending high quality surround sound to an external amplifier.

PCs may also include an input/output (I/O) controller that takes input from a mouse and keyboard. The I/O controller essentially serves as the front door between the user and the computer. The I/O controller also reads and writes data to disk drives. Data stored on the disk drives remain intact even when the PC is turned off.

The PC often includes a "graphics controller" that may drive a display device such as a monitor. The graphics controller controls the visual interface to the PC. The graphics controller may display video on the PC. Some graphics controllers can also capture video. A graphics controller may operate with a default software configuration unless programmed otherwise for a particular device configuration. Although not illustrated, as different PCs may have different graphics controllers, a plurality of graphics controllers may need to be considered when selecting a display device for the PC. Each of the graphics controllers may be considered to operate with its particular default graphics controller software.

The collection of physical silicon that is the memory controller and I/O controller is often referred to as a "chipset." The chipset may be soldered directly to a thin sandwich of insulation and conductive paths known as a motherboard.

The audio and graphics controllers may be separate silicon chips soldered directly to the motherboard, or they may be placed on daughter cards and plugged into expansion slots on the motherboard. Daughter cards are easily removable and thus easily upgradeable.

To display "images" on a "display device" (sometimes referred to herein as only a "display") requires a codec. As will be understood by those of ordinary skill in the art and viewing the present disclosure, the term display is used herein to encompass displays such as flat panel screens, computer monitors, LCDs (liquid crystal displays), HDTVs (high definition televisions), plasma television screens, etc. In addition, display may refer to either digital or analog displays that operate with similar techniques.

A "codec" is the interface between a display and digital signals that are being transmitted to the display to provide an image to be displayed on the display or computer monitor. As described in more detail in relation to FIGS. 1-3, the digital signals may be transmitted from a computer processor 102 to a computer monitor/display 120, or the digital signals may originate from a television signal source such as a standard cable television outlet 170, satellite transmission 180, or other source of digital signals such as a non-satellite wireless transmission device 190 to a television screen/display 150 such as may be found in a home entertainment center or otherwise. Further, the digital signals may be transmitted from some other source of digital images before being received at a digital display. Of course, the digital images will pass through a codec, e.g., codec 119, wireless graphics controller/codec 160, etc.

The codec is sometimes referred to as a "display codec." Because of the varied types of digital displays available to consumers, developers of display codecs have been unable to produce an acceptable display codec to support digital displays in general. Display codecs may be "configured" to meet the particular specifications of the digital display with which it is expected to communicate for the display of images. Display codecs may be developed with particular default settings which may be referred to as a "default configuration" that may be later modified to fit the needs of a particular digital display for displaying images, and, among other things, depending on the source of the digital signals for display on the digital display. Further, for at least the same reasons, developers of graphics controllers have not been able to produce a graphics controller for displaying digital images on different types of displays, i.e., computer monitors, television screens, flat panel/screen display devices, etc.

The phrase display codec, also referred to herein as a "digital display codec" is intended to include software and possibly one of, or a combination of both, analog and digital hardware devices. As referred to herein, the display codec may convert input signals representing, at least in part, successive pictures/images (video) into a different video format for producing output signals that may then be transmitted by the display codec. Both the input and output signals may be analog, digital, or a combination of both analog and digital. In addition to signals explicitly encoding and/or representing the pictures themselves, the codecs may accept input control signals that affect the behavior of the display codec by modifying register values that may be associated with the display codec. The display codec may also accept as an input and/or transmit as an output, among other things, information about the picture format such as a resolution and aspect ratio.

The term "software driver" as used herein refers to a module (software, hardware, or otherwise) that may control compliant display codecs. A software driver known as a "universal software driver" may control multiple display codecs that may have different codec capabilities. The universal software driver may control more than one type of display codec without modification, e.g., the universal software driver may remain in a "default configuration" when the display codec is changed. This control is sometimes referred to as "recognizing" or "communicating" with a digital display because the display codec for the particular digital display may "receive" and/or "transmit" digital signals from a source and be configured to recognize those digital signals before communicating with or transmitting to an associated digital display for the display of images that correlate to the digital signals.

As used herein, the term "program" includes 1) a software program which may be stored in a storage medium and is executable by a processor or 2) a hardware configuration program useable for configuring a programmable hardware element.

The term "software program" is intended to include any type of program instructions, code, script and/or data, or combinations thereof, that may be stored in a storage medium and executed by a processor or processing system. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software.

The term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic." A programmable hardware element may be configured using a hardware configuration program.

The term "hardware configuration program" is intended to include a program or data structure that can be used to program a programmable hardware element.

The term "machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

The phrase "storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, flash, magnetic or semiconductor storage media. However, these are merely examples of a storage medium and embodiments of the present invention are not limited in these respects. Storage medium is also sometimes referred to as a memory medium, a machine-readable medium, a computer-readable medium, a processor-readable medium, etc., but for purposes of the present disclosure will be referred to only as storage medium.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or FPGA. Also, logic may comprise machine-readable instructions stored in a storage medium in combination with processing circuitry to execute such machine-readable instructions. However, these are merely examples of structures which may provide logic and embodiments of the present invention are not limited in this respect.

A "processing system" as referred to herein relates to hardware and/or software resources for processing expressions that may be found in a storage medium. A "host processing system" relates to a processing system which may be adapted to communicate with a "peripheral device." For example, a "peripheral" device may provide inputs to or receive outputs from a host processing system. However, these are merely examples of processing and host processing systems and a peripheral device, and embodiments of the present invention are not limited in these respects.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a diagram illustrating a system embodiment 130. As shown in the abstract, system 130 includes a graphics controller/codec device 160 that is coupled to a display 150. The system 130 may include a satellite 140 having an antenna 142 that transmits digital signals 180 to an antenna 144 at the graphics controller/codec device 160 before passing to the display 150. The digital signals 180 enter the graphics controller/codec device 160 where the digital signals 180 are processed for transmission to the display 150. The graphics controller portion of the device 160 includes a software driver that is configured to work with different codecs at different periods of time while using a default configuration of the software driver. The software driver of the graphics controller/codec device 160 is written to meet a standard that allows codec hardware to be exchanged while leaving the graphics controller software in the graphics controller/codec device 160.

Also illustrated in FIG. 1 is a cable television outlet 170 that may supply digital signals to the graphics controller/codec device 160 before passing those signals on to the display 150. In addition, the system 130 may include a non-satellite wireless transmission device 170 that may transmit signals to the graphics controller/codec device 160 via an antenna 192 transmitting signals to the antenna 144 of the graphics controller/codec device 160 before passing the signals to the display 150. The graphics controller/codec device 160 should be understood to include the appropriate hardware/software to recognize and communicate with the signals whether the signals originate from satellite 140, non-satellite 190, cable TV outlet 170, etc.

Of course, the system 130, or individual components of the system 130 could be realized via software emulation as will be understood by those of ordinary skill in the art upon viewing the present embodiments.

Figure 2:
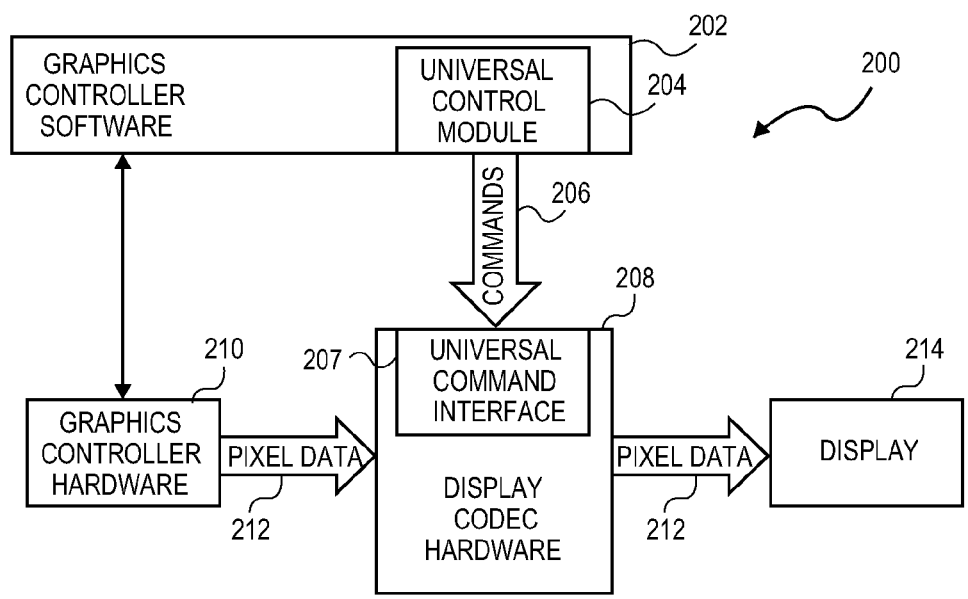
FIG. 2 is a diagram illustrating data and command transmission in systems such as FIG. 1.
Figure 3:
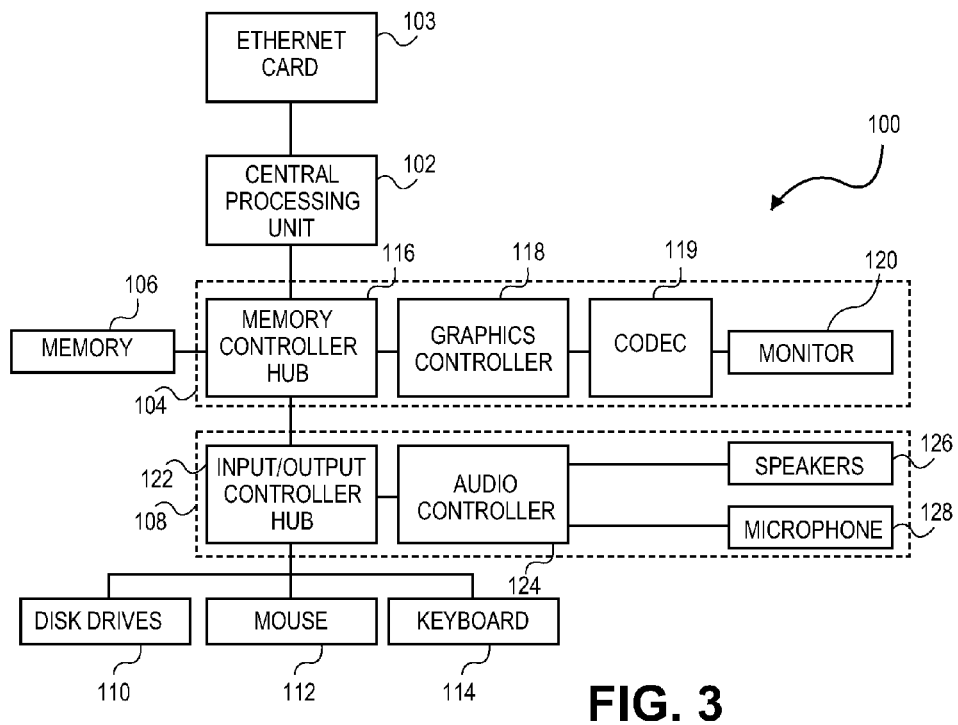
FIG. 3 is a detailed diagram illustrating a system embodiment.

FIG. 2 is a diagram illustrating an exemplary embodiment of display data transmissions 200 in the system 130, specifically showing software-hardware interactions in a first portion of the system 130 such as the first portion 104 (see FIG. 3). Graphics controller software 202 may have a control module 204 that sends software commands 206 to a command interface 207 of display codec hardware 208. The graphics controller software 202 also communicates with graphics controller hardware 210 where pixel data 212 is transmitted to the display codec hardware 208. The pixel data 212 is formatted in the display codec hardware 208 according to the commands 206 that are received at the command interface 207 of the display codec hardware 208 before the pixel data 212 is transmitted to a digital display 214. The digital display 214 may display the pixel data 212 in a manner that allows the pixel data 212 to be viewed by a user of a system such as the system 130. Those of ordinary skill in the art will appreciate that the digital display 214 may be replaced with the display 150, the digital display 314 (see FIG. 4), and/or another similar display. In other words, a plurality of displays have been illustrated in the accompanying figures. Further, those of ordinary skill in the art will appreciate that the software driver may comprise part of the graphics controller software 202, sometimes referred to herein as the universal software driver. The universal software driver may be located in the storage medium 106 (see FIG. 3) or in another suitable storage medium.

FIG. 3 is a diagram illustrating a system embodiment 100. System 100 may support digital display codecs using a driver according to an exemplary embodiment of the present invention. System 100 may include a central processing unit (CPU or processor) 102, an Ethernet card 103 may also be coupled to the CPU 102, and the CPU 102 may be coupled to a first portion 104 of the computer system 100. A memory (storage medium) 106 may be coupled to the first portion 104 and the first portion 104 may also be coupled to a second portion 108 which in turn may be coupled to other computer devices such as disk drives 110, a mouse 112, and a keyboard 114.

In the illustrated embodiment, the first portion 104 includes a memory control hub 116 that may be coupled to the memory 106, the CPU 102, the second portion 108, and a graphics controller 118. The graphics controller 118 may be coupled to a display codec 119 which may be coupled to a monitor (sometimes referred to as a "display") 120 for transmission of digital signals to display, among other things, graphical or digital images on the monitor 120. The second portion 108 includes an input/output controller hub 122 that may be coupled to the memory controller hub 116 of the first portion 104. The input/output controller hub 122 may also be coupled to an audio controller 124 which may in turn be coupled to speakers 126 and/or a microphone 128. As described in more detail in relation to FIG. 2, the first portion 104 of the computer system 100 operates with a display codec that may include a command interface.

Figure 4:
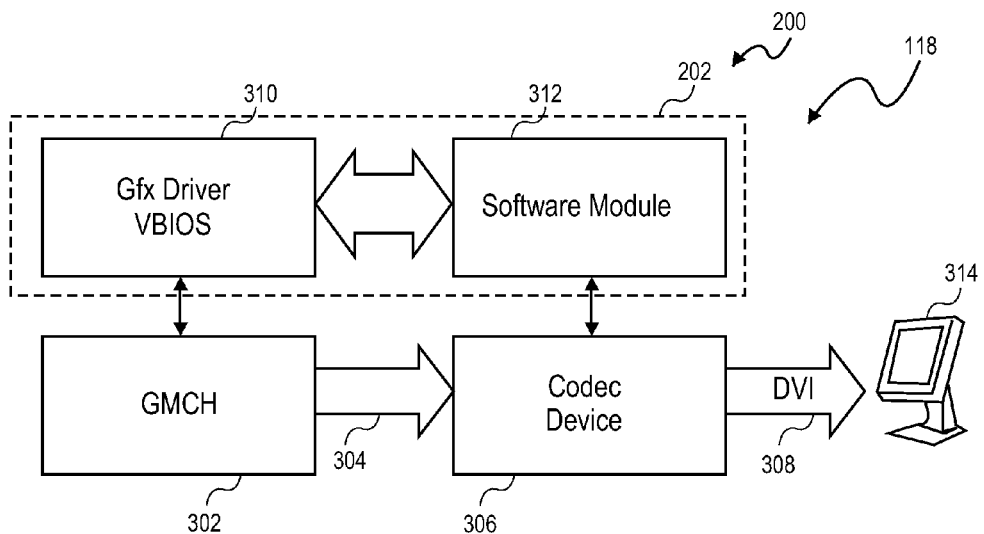
FIG. 4 is a diagram illustrating software-hardware interactions that may occur at least in part in transmissions of FIG. 2.

FIG. 4 is a diagram illustrating exemplary software-hardware interactions that may occur in the digital display data transmissions 200 when digital signals are transmitted to the computer monitor (or digital display) 314. One may appreciate that the illustrated software-hardware interactions may occur in the first portion 104. The graphics controller 118 includes an integrated Graphics Memory Controller Chipset (GMCH) 302 supporting one or more ports 304, such as a Serial Digital Video Output (SDVO) port. The port 304 communicates with a device (or codec) 306 for DVI (Digital Video Interface) communication 308 with the computer monitor 314.

DVI is a specification created by the Digital Display Working Group (DDWG) to accommodate analog and digital monitors with a single connector. The codec 306 is electrically coupled to the GMCH 302 via the aforementioned bus/port 304 (which carries pixel data) and a high speed serial command interface (i.e. I2C (Inter-IC) bus, i.e., a bi-directional two-wire serial bus that provides a communication link between integrated circuits (ICs)). The codec 306 allows multiple display types to be supported by the GMCH 302.

The graphics controller software 202 includes video BIOS (basic input/output system) and software drivers 310. As understood by those of ordinary skill in the art, BIOS is the program a personal computer's microprocessor uses to get the computer system started after receiving power. It also manages data flow between the computer's operating system and attached devices such as the hard disk, video adapter, keyboard, mouse, and printer.

The video BIOS and software drivers (VBIOS) 310 communicate with both the GMCH 302 and a software module 312 which may be referred to as a type of display codec. A uniform command interface for the software module 312 eliminates the need for hard-coding or for a hardware abstraction layer (HAL) in the graphics controller 118. It should be recognized that no hardware abstraction layer is needed in the graphics controller 118 because a uniform hardware interface is defined/specified with the software module 312 and the codec 306. As a result, multiple display codecs may be supported by a single "universal" software module that is part of the graphics controller software 202.

This methodology offers several benefits. For example, software module 312 is supported without software update because many codecs can be supported by a single software driver because the codecs respond to each and every command in a standardized manner. In addition, users can add a newly developed software module 312 to their computer system 100 and have that module 312 supported without needing to upgrade their VBIOS 310 or graphics drivers.

Another benefit is the reduction of graphics software controller code size. For example, rather than having several codec software modules (one for each codec) which perform very similar functions, there is a single module 204.

Further benefits include allowing the software module/display codec 312 to be used in other environments with less effort. Conventional technologies find it difficult to support the display codec 312 across a wide range of operating environments. For example, work done to get a set of display codecs working in some operating systems will not aid support of the codecs in other operating systems or embedded applications. New abstraction layers must be developed for each environment. Through the use of the disclosed embodiment, simply porting the control module 204 to a new environment means that many display codecs 312 will work in that environment. Another advantage of the disclosed embodiment is that codec vendors are able to make codec models without requiring a software update for new codecs to work.

Graphics controller software 202 development constraints (e.g., adding other features, fixing bugs, headcount constraints) have often prevented codec vendors from implementing their desired product. The disclosed embodiment establishes a large number of display codecs 312 that may be supported without any additional development effort needed in the graphics controller software 202.

The disclosed embodiment describes, among other things, a standard SDVO command set that an SDVO codec must support. The graphics controller software 202 uses these commands to query the device 306 on its capabilities. The software 202 also uses the commands to configure and control the software module (codec) 312. The SDVO command set provides a standard for SDVO codecs and a driver (software module 312) that allow SDVO codecs to be controlled by a single "universal" software module.

Figure 5:
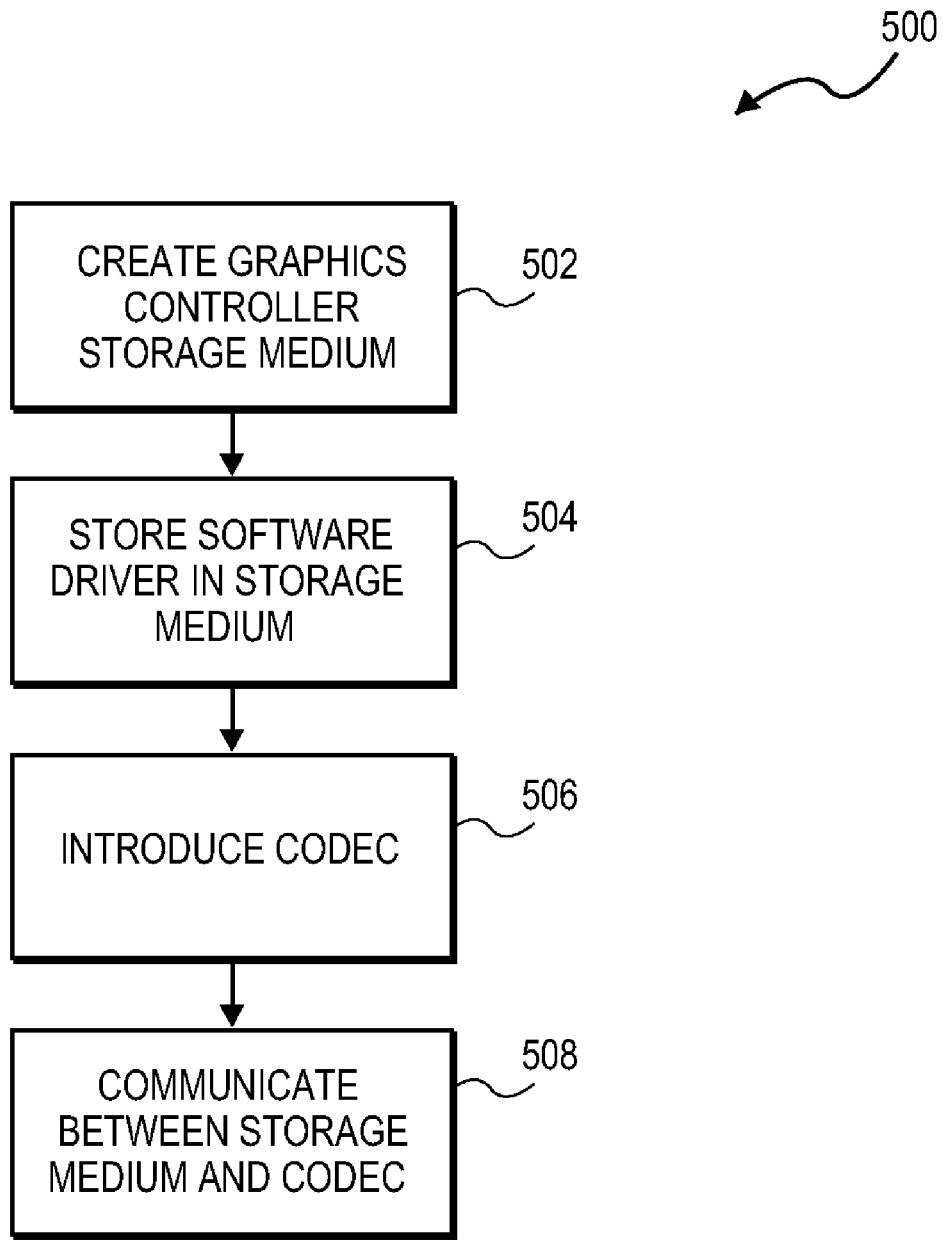
FIG. 5 is a flow diagram of a process for communicating between a codec and a graphics controller according to principles of an embodiment.

FIG. 5 is a flow diagram 500 of a process for communicating between a codec and a graphics controller according to principles of a disclosed embodiment. In a first step 502, a storage medium is created for storing at least portions of a graphics controller. In a second step 504, the storage medium is used to store a software driver that is configured to work with different display codecs at different periods of time while using a default configuration of the software driver. Next step 506 is when a codec is introduced into the system to communicate with the graphics controller. In the final step 508, communication takes place between the graphics controller and the codec. As described herein, the codec may be replaced without needing to replace the software driver, hence, the term universal software driver. Of course, the above described steps are not necessarily limited to the order in which they are described.

While the present disclosure has been used to describe several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An article comprising:
   a storage medium comprising machine-readable instructions stored thereon to
   execute a software driver to control a plurality of display codecs including a first display codec and a second display codec, the software driver having a default configuration to control the plurality of display codecs, wherein the software driver is configured to control the first display codec via first set of commands, and wherein the software driver is configured to control the second display codec via the first set of commands, wherein the software driver remains in the default configuration and the first set of commands are being without modification when the first display codec is changed to the second display codec; and the software driver to control transmitting first data from the first display codec to a first display device and to control transmitting second data from the second display codec to a second display device.

2. The article of claim 1 wherein the software driver comprises machine readable instructions to recognize each of a plurality of displays.

3. The article of claim 2 wherein the plurality of displays consist of digital displays selected from the group consisting of a flat panel, a LCD (liquid crystal display), an HDTV (high definition television), a plasma display, and a computer monitor.

4. The article of claim 1 wherein the storage medium receives digital signals from a cable television outlet.

5. The article of claim 1 wherein the storage medium receives digital signals from a satellite.

6. The article of claim 1 wherein the storage medium receives digital signals from a wireless transmission device.

7. A method comprising:
   executing a software driver to control a plurality of display codecs including a first display codec and a second display codec, the software driver having a default configuration to control the plurality of display codecs, wherein the software driver is configured to control the first display codec via first set of commands, and wherein the software driver is configured to control the second display codec via the first set of commands, wherein the software driver remains in the default configuration and the first set of commands are being without modification when the first display codec is changed to the second display codec, wherein the first display codec is configured to transmit the data to a first display device and the second display codec is configured to transmit the data to a second display device.

8. The method of claim 7 wherein the software driver is part of a graphics controller for communicating with a plurality of display codecs.

9. The method of claim 8 wherein each of the display codecs comprises a hardware portion that communicates with the software driver such that the graphics controller recognizes each of the plurality of display codecs at different periods of time.

10. The method of claim 8 where the software driver comprises a storage medium for the graphics controller known as a universal software driver.

11. A system comprising:
   a processor;
   a memory coupled to the processor;
   a first display device that communicatively couples with the processor through a first display codec to display images, wherein the first display codec is configured to transmit first data for the first display device; and
   a graphics controller having a software driver having a default configuration to control a plurality of display codecs, wherein the software driver is configured to control the first display codec via first set of commands, and wherein the software driver is configured to control the second display codec via the first set of commands, wherein the software driver remains in the default configuration and the first set of commands are being without modification when the first display codec is changed to a second display codec, wherein the second display codec is configured to transmit second data to a second display device, the graphics controller being communicatively coupled to the processor.

12. The system of claim 11 wherein the software driver comprises a universal software driver.

13. The system of claim 11 wherein the first display is a digital display.

14. The system of claim 13 wherein the first display is selected from the group consisting of a flat panel, a LCD (liquid crystal display), an HDTV (high definition television), a plasma display, and a computer monitor.

15. A graphics controller comprising:
a memory, and
a software driver coupled to the memory, wherein the software driver has a default configuration to control a plurality of display codecs including a first display codec and a second display codec, wherein the software driver is configured to control the first display codec via first set of commands, and wherein the software driver is configured to control the second display codec via the first set of commands, wherein the software driver remains in the default configuration and the first set of commands are being without modification when the first display codec is changed to the second display codec, wherein the first display codec is configured to transmit first data to a first display device, and a second display codec is configured to transmit second data to a second display device.

16. The graphics controller of claim 15 wherein the software driver comprises a universal software driver.

17. The graphics controller of claim 15 further comprising a storage medium for the software driver that communicates with at least the first display codec, the software driver recognizing each of the plurality of display codecs.

18. A method comprising:
emulating a graphics controller having a universal software driver to allow the graphics controller to control a plurality of display codecs including a first display codec and a second display codec, wherein the universal software driver has a default configuration to control the plurality of display codecs, wherein the universal software driver is configured to control the first display codec via first set of commands, and wherein the software driver is configured to control the second display codec via the first set of commands, wherein the software driver remains in the default configuration and the first set of commands are being without modification when the first display codec is changed to the second display codec, wherein the first display codec is configured transmit first data to a first display device and the second display codec is configured to transmit second data to a second display device.

19. The method of claim 18 further comprising
emulating replacing the first one of the plurality of display codecs with the second one of the plurality of display codecs.

20. The method of claim 19 wherein the second one of the plurality of display codecs is an SDVO codec.

* * * * *